(No Model.)

C. B. MORGAN.
Gate.

No. 231,968. Patented Sept. 7, 1880.

Witnesses:
A. Ruppert
D. P. Cowl

C. B. Morgan
Inventor:
D. P. Holloway
Atty.

UNITED STATES PATENT OFFICE.

CALEB B. MORGAN, OF DUBLIN, INDIANA.

GATE.

SPECIFICATION forming part of Letters Patent No. 231,968, dated September 7, 1880.

Application filed April 16, 1880. (No model.)

*To all whom it may concern:*

Be it known that I, CALEB B. MORGAN, a citizen of the United States, residing at Dublin, in the county of Wayne and State of Indiana, have invented certain new and useful Improvements in Farm-Gates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in gates the movements of which are imparted by the wheels of a carriage in passing it, or by a lever or levers; and the objects of my invention are, first, to provide a gate with hinges, cranks, and rods or levers acting upon the upper portion thereof in such a manner that by properly directing a carriage one of its wheels shall act upon a bent rod, and thus be made to so act upon the crank attached to the upper portion of the end bar of the gate as to force it open, and by supplying a similar rod upon its opposite side it may be closed after the vehicle has passed it, or by fixing a lever in its proper position the gate may be operated by it by a person on the back of a horse or sitting in a carriage; second, to so construct the parts that the operating-rod may be shifted from the bottom of the gate to the top thereof, and thus raised so as not to be obstructed by snow and ice or other substances. I attain these objects by the mechanism illustrated in the accompanying drawings, in which—

Figure 1:
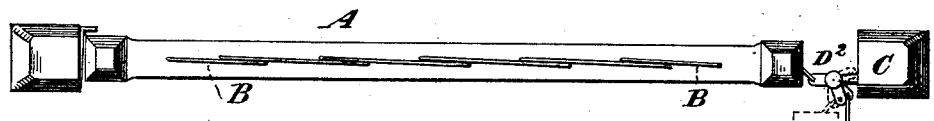
Figure 2:
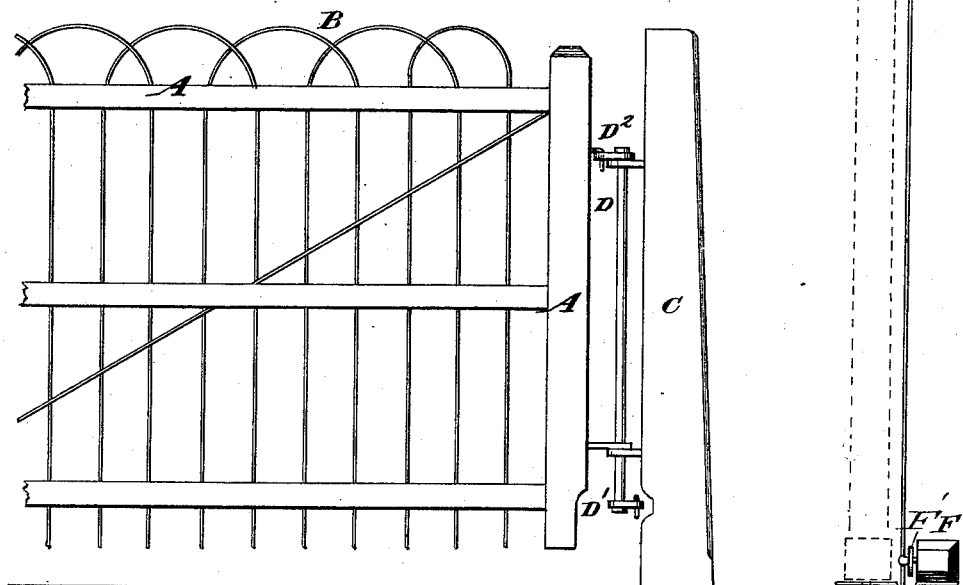
Figure 3:
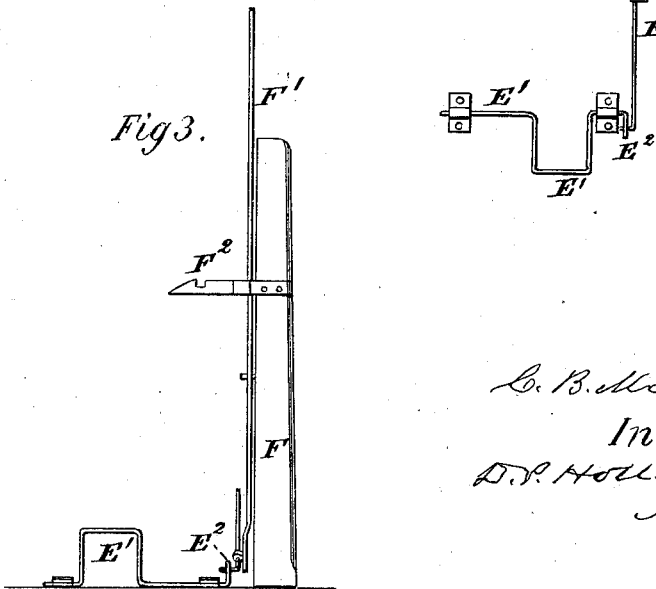

Figure 1 is a plan or top view of a gate and its operating devices, showing my improvements as attached thereto. Fig. 2 is an elevation of the same, showing the gate, the hinges by which it is suspended to a post, a vertically-arranged rod, and cranks for operating the gate; and Fig. 3 is an elevation showing a post to which a lever is affixed for operating the gate, a catch for holding the same in its open position, and a bent rod, by which the movements may be imparted to the gate by the wheels of a passing vehicle.

Similar letters refer to similar parts throughout the several views.

In constructing gates for the application of my improvements I use any desired form, giving preference to such form and material as will give the requisite strength with the least amount of weight.

In the present instance the gate consists of a frame, A, made of wood, it having end bars and three cross-rails, through the latter of which pass bent rods of metal, B, which are placed so near each other as to prevent the passage of the smaller animals, such as hogs and sheep.

The gate A, however constructed, is suspended to a post, C, which is firmly secured in the earth or to a suitable fixed foundation by means of a hinge of suitable construction near its lower side or edge. Near the upper edge of said gate, in post C, there is placed an eyebolt, through which a vertical rod, D, passes, said rod also passing through an aperture formed in the lower hinge. Upon the lower end of rod D there is secured a crank, D', and upon its upper end a crank, $D^2$, which may have a square aperture in it for the reception of the upper end of the rod D, or it may be round, and the rod be provided with a screw-thread and a nut outside of the crank for holding it in position. The weight of the gate and the cranks D' and $D^2$ rest upon the eyebolt near the upper end of the post C; but a portion of it may be made to rest upon the lower hinge, if preferred, by placing a collar on rod D at such a point as to cause it to come in contact with said hinge at the same time that the crank $D^2$ comes in contact with the eyebolt.

I have shown a method of operating the gate, which consists in providing a rod or bar of metal, E, one end of which is pivoted to the crank D' upon the lower end of rod D, from which point it extends at, or nearly at, a right angle to the gate when closed, and sufficiently far to admit of there being attached to its opposite end a bent rod or crank, E', which, when the gate is closed, is in the position shown in Fig. 3, and hence when it is desirable to open the gate by a wheel of a passing vehicle it is only necessary to so direct said vehicle as to cause the wheel to strike the elevated portion of E', which will be forced downward, and its arm $E^2$ will be made to shift the position of rod E to such an extent as to open the gate, it acting upon rod D, cranks D' and D², and, through them, upon said gate and opening the same, which may be closed upon the opposite side by means of similar devices, which may be also used to open the gate when the vehicle is approaching from the opposite direction, in which case it may be closed by the machinery above described; or it may be both opened and closed by combining with the rod E, crank E', and other operating parts, D, D', and D², a lever, F', as shown in Fig. 3, such combination rendering it practicable to open and close the gate while sitting upon the back of a horse, and when there is no vehicle to operate upon the crank E'.

Having thus described my invention, what I claim, and desire to secure by Letters Patent, is—

The combination, in a farm-gate, of the swinging portion A, vertical rod D, cranks D' and D², rod E, crank E', and operating-lever F', the parts being arranged for joint operation substantially as set forth, whereby the gate may be opened and closed by the wheel of a passing vehicle, or by a person sitting upon the back of an animal, as described.

In testimony whereof I affix my signature in presence of two witnesses.

CALEB B. MORGAN.

Witnesses:
M. Z. CARMONY,
S. F. CRULL.